US010112161B2

(12) United States Patent
Hoefken (10) Patent No.: US 10,112,161 B2
(45) Date of Patent: Oct. 30, 2018

(54) STIRRING DEVICE FOR WASTEWATER HAVING A SLIDE SLEEVE AND A DEVICE FOR DETECTING STATE OF WEAR OF THE SLIDE SLEEVE

(71) Applicant: INVENT UMWELT—UND VERFAHRENSTECHNIK AG, Erlangen (DE)

(72) Inventor: Marcus Hoefken, Erlangen (DE)

(73) Assignee: INVENT UMWELT—UND VERFAHRENSTECHNIK AG, Erlangen (DE)

( * ) Notice: Subject to any disclaimer, the term of this patent is extended or adjusted under 35 U.S.C. 154(b) by 98 days.

(21) Appl. No.: 15/113,578

(22) PCT Filed: Mar. 2, 2015

(86) PCT No.: PCT/EP2015/054299
§ 371 (c)(1),
(2) Date: Nov. 7, 2016

(87) PCT Pub. No.: WO2015/135783
PCT Pub. Date: Sep. 17, 2015

(65) Prior Publication Data
US 2017/0065945 A1    Mar. 9, 2017

(30) Foreign Application Priority Data
Mar. 14, 2014    (DE) .................. 10 2014 204 824

(51) Int. Cl.
*B01F 13/04*    (2006.01)
*F16C 17/24*    (2006.01)
(Continued)

(52) U.S. Cl.
CPC ........ *B01F 13/047* (2013.01); *B01F 7/00541* (2013.01); *B01F 7/16* (2013.01);
(Continued)

(58) Field of Classification Search
CPC ................ B01F 7/0055; B01F 7/00541; B01F 15/00922; B01F 7/00033; B01F 7/0015;
(Continued)

(56) References Cited

U.S. PATENT DOCUMENTS 5,198,763 A * 3/1993 Konishi .................... G01B 7/02
250/231.13
5,244,287 A * 9/1993 Yoshikawa ............. F16C 17/24
384/448

(Continued)

FOREIGN PATENT DOCUMENTS

DE    9106639 U1    9/1991
DE    19751591 B4    9/2004
(Continued)

OTHER PUBLICATIONS

PCT/IPEA/409, "International Preliminary Report on Patentability for International Application No. PCT/EP2015/054299," dated Jan. 2016.
(Continued)

*Primary Examiner* — Charles Cooley
(74) *Attorney, Agent, or Firm* — Manabu Kanesaka (57) ABSTRACT

A stirring device for wastewater includes a drive device having a drive shaft extending vertically in the assembled state, a stirring body mounted on the drive shaft, a safety bearing in which a free end of the drive shaft is rotatably held, a slide sleeve is mounted on the free end of the drive shaft, and a device for detecting a state of wear of the slide sleeve. The device for detecting the state of wear includes a sensor mounted on the safety bearing and an evaluation device for evaluating the signals delivered by the sensor.

9 Claims, 8 Drawing Sheets (51) Int. Cl.
 G01M 13/04 (2006.01)
 B01F 7/16 (2006.01)
 B01F 15/00 (2006.01)
 B01F 7/00 (2006.01)

(52) U.S. Cl.
 CPC ...... B01F 13/045 (2013.01); B01F 15/00201 (2013.01); B01F 15/00707 (2013.01); B01F 15/00922 (2013.01); F16C 17/246 (2013.01); G01M 13/04 (2013.01); B01F 2015/0011 (2013.01); B01F 2215/0052 (2013.01); F16C 2233/00 (2013.01); F16C 2320/16 (2013.01)

(58) Field of Classification Search
 CPC .......... B01F 2215/0052; B01F 7/00725; B01F 13/047; B01F 15/00201; B01F 15/00707; B01F 7/16; B01F 2015/0011; B01F 13/045; B21D 53/267; G01M 13/04; F16C 17/246; F16C 2233/00; F16C 2320/16
 USPC ........ 416/231 R, 231 A; 366/331; 73/114.81
 See application file for complete search history.

(56) References Cited

U.S. PATENT DOCUMENTS

| | | | | |
|---|---|---|---|---|
| 5,568,985 A * | 10/1996 | Schutte | .................. | F16C 33/76 384/478 |
| 5,618,107 A * | 4/1997 | Bartsch | .................... | B01F 7/22 366/249 |
| 5,701,119 A | 12/1997 | Jurras, III | | |
| 7,402,023 B2 * | 7/2008 | Kupidlowski | .......... | B01F 7/001 366/331 |
| 9,050,567 B2 * | 6/2015 | Hoefken | .............. | B01F 7/00541 |
| 2009/0223083 A1 | 9/2009 | LeCrone | | |
| 2011/0003646 A1 * | 1/2011 | Hoefken | .............. | B01F 3/04539 464/178 |
| 2012/0109539 A1 * | 5/2012 | Hasegawa | ............ | B23Q 17/008 702/34 |
| 2012/0307587 A1 * | 12/2012 | Hoefken | .............. | B01F 7/00541 366/331 |
| 2017/0065945 A1 * | 3/2017 | Hoefken | .............. | B01F 7/00541 |

FOREIGN PATENT DOCUMENTS

| | | | | |
|---|---|---|---|---|
| DE | 102005049373 A1 | 4/2007 | | |
| DE | 202010009537 U1 | 10/2010 | | |
| GB | 2064675 A * | 6/1981 | .............. | F16C 17/24 |
| GB | 2192949 A | 1/1988 | | |
| JP | S50-92462 U | 8/1975 | | |
| JP | H07-332355 A | 12/1995 | | |
| SU | 727886 A1 | 4/1980 | | |
| WO | 2011/083063 A1 | 7/2011 | | |
| WO | WO-2011083063 A1 * | 7/2011 | .......... | B01F 7/00541 |
| WO | 2014/010027 A1 | 1/2014 | | |

OTHER PUBLICATIONS

PCT/ISA/210, "International Search Report for PCT/EP2015/054299", dated Jun. 9, 2015.
PCT/ISA/237, "Written Opinion of the International Searching Authority for PCT/EP2015/054299," dated Jun. 2015.

* cited by examiner

STIRRING DEVICE FOR WASTEWATER HAVING A SLIDE SLEEVE AND A DEVICE FOR DETECTING STATE OF WEAR OF THE SLIDE SLEEVE

CROSS-REFERENCE TO RELATED APPLICATIONS

The present application is National Phase of International Application No. PCT/EP2015/054299, filed Mar. 2, 2015, and claims priority from German Application No. 10 2014 204 824.9, filed Mar. 14, 2014, the disclosure of which is hereby incorporated by reference herein in its entirety.

BACKGROUND OF THE INVENTION

Field of the Invention

The invention relates to a stirring device for wastewater.

Description of the Related Art

Such a stirring device is known from WO 2011/083063 A1. In the known stirring device a drive device is secured to a bridge spanning a wastewater tank. A drive shaft, to which a stirring tool is secured, extends from the drive device in a vertical direction. A free end of the drive shaft is rotatably held in a safety bearing secured to the base of the wastewater tank. Sludge and sand are contained in the wastewater. Consequently, the free end of the stirring shaft becomes worn. A play between the free end of the stirring shaft and a bearing bush of the safety bearing can be of such a size that the free end breaks. Consequently, uncontrolled movements of the stirring body may lead to a destruction of the stirring body and/or to a breakage of the drive shaft.

The object of the invention is to overcome the disadvantages according to the prior art. In particular, a stirring device for wastewater will be specified, with which the risk of total damage is avoided.

This object is achieved by one aspect of the invention. Expedient embodiments of the invention will emerge from the other aspects of the invention.

SUMMARY OF THE INVENTION

In accordance with the invention it is proposed that a slide sleeve is mounted on the free end of the drive shaft, and in that an device for detecting a state of wear of the slide sleeve is provided. The state of wear of the free end of the drive shaft can only be identified in stirring devices according to the prior art when the free end of the stirring shaft is removed from the safety bearing, such that a visual check is possible. This is time-consuming and costly. In accordance with the invention a slide sleeve is provided at the free end of the drive shaft. The slide sleeve surrounds the free end of the drive shaft and is connected thereto for conjoint rotation therewith. A arrangement for detecting the state of wear of the slide sleeve is also provided. If a certain predefined state of wear is detected by the device for detecting the state of wear, this can be identified outside the wastewater tank during operation. It is then possible to change the slide sleeve in good time, such that excessive wear of the free end of the drive shaft can be safely and reliably avoided. Total damage caused by a breakage of the drive shaft may no longer be a concern.

In accordance with an advantageous embodiment of the invention the device for detecting the state of wear comprises a sensor mounted on the safety bearing and an evaluation device for evaluating the signals delivered from the sensor. The evaluation device is expediently located outside the wastewater tank. It is connected to the sensor via a cable. It is advantageously combined with a control unit for controlling the drive device. A control unit of this type may comprise an emergency stop switch for manually shutting down the drive device.

The evaluation device expediently comprises a circuit, which, upon detection of a predefined state of wear, automatically shuts down the drive device. Significant damage or total damage can therefore be avoided safely and reliably. The circuit can be formed such that a recommissioning of the stirring device is possible only following actuation of a switch, which opens automatically in the event of automatic shutdown.

In accordance with a further advantageous embodiment the device for detecting the state of wear comprises a display device for displaying an operating state determined by the evaluation device. The operating state may be the state of wear of the slide sleeve and/or an emergency stop state. The display device can comprise optical and/or acoustic signal means. An "emergency stop state" is understood to mean a state provided as a result of an automatic shutdown of the drive means in the event of detection of the predefined state of wear. The operating state can of course also be displayed by means of a computer in a central monitoring device.

The safety bearing can comprise a bearing bush surrounding the slide sleeve, and the sensor is advantageously mounted on the bearing bush. The safety bearing can also comprise a holding device for securing to a base of the wastewater tank, and the bearing bush is expediently secured to the holding device detachably. The bearing bush can be displaceable in particular relative to the holding device, such that it can be adjusted with respect to the drive shaft, even once the holding device has been secured to the base of the wastewater tank.

The sensor can be a magnetic field sensor, an induction coil, a switch contact, or a strain or vibration sensor. A magnetic field sensor, in particular a Reed switch or a Hall sensor, is advantageously used. The use of a magnetic field sensor enables a particularly simple embodiment of the evaluation device.

At least one detection element detectable by means of the sensor is accommodated in the slide sleeve. A plurality of detection elements are advantageously accommodated in the slide sleeve in an device distributed over the periphery of said slide sleeve. The detection elements are expediently uniformly distributed over the periphery. The plurality of detection elements in accordance with a particularly advantageous embodiment are provided in the slide sleeve at different depths from one another with respect to an outer periphery of the slide sleeve. When the slide sleeve is new, all detection elements are provided. A first pulse frequency indicating the unworn state of the slide sleeve is detected by the sensor at a predefined operational speed of rotation of the drive shaft. With increasing wear of the slide sleeve, the detection elements provided at different depths with respect to the outer periphery of the slide sleeve break off in succession. The loss of each detection element causes a change to the pulse frequency detected by means of the sensor. By means of the evaluation device, a display signal corresponding to the state of wear for display by means of the display device and/or an emergency stop signal for the automatic shutdown of the drive device can be produced herefrom.

With use of a strain or vibration sensor, it is possible to determine the state of wear of the slide sleeve from a state of vibration. A further switch contact can also be provided in the slide sleeve, which switch contact is electrically conductively connected to the stirring shaft, which is preferably produced from metal. When the further switch contact comes into contact with the switch contact provided on the bearing bush, an electric circuit is closed, which indicates a certain state of wear.

In accordance with a further embodiment the stirring body is formed in a hyperboloid-like manner. A stirring body of this type is known for example from WO 2011/083063 A1.

Exemplary embodiments of the invention will be explained in greater detail hereinafter on the basis of the drawings, in which:

DESCRIPTION OF THE PREFERRED EMBODIMENT

Figure 1:
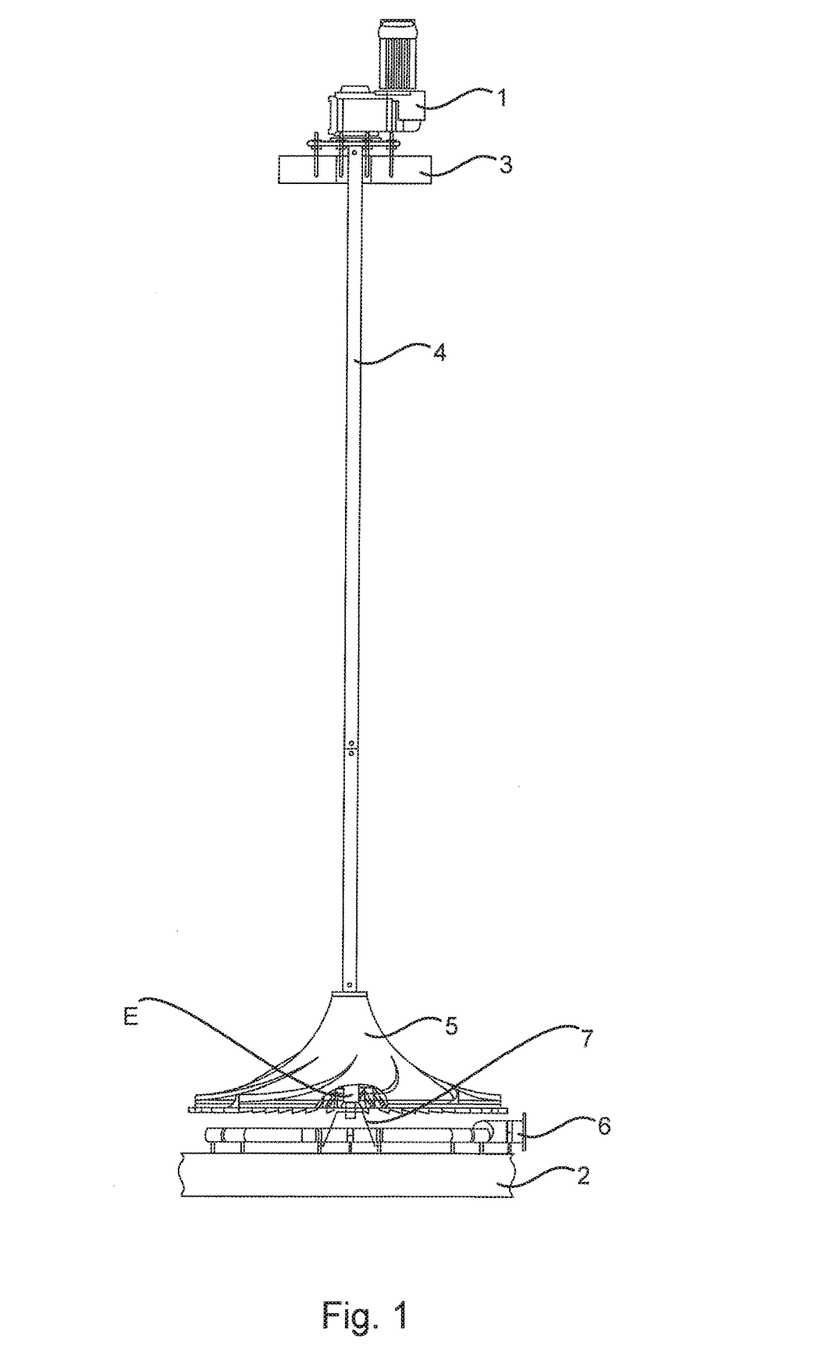
FIG. 1 shows a schematic side view of a stirring device.

In the case of the stirring device shown in FIG. 1, a drive device 1 is secured above a tank base 2, for example to a bridge 3 spanning a wastewater tank (not shown here). The tank base 2 extends in a horizontal direction. In the shown assembled state, a drive shaft 4 extends in a vertical direction from the drive device 1, and a hyperboloid stirring body 5 is mounted on said drive shaft. A free end of the drive shaft 4 extending from an underside of the hyperboloid stirring body 5 is designated by the reference sign E. A ring line 6 for feeding air into a region beneath the hyperboloid stirring body 5 is provided between the tank base 2 and the hyperboloid stirring body 5. Reference sign 7 designates generally a safety bearing mounted on the tank base 2, in which bearing the free end E of the drive shaft 4 is rotatably held.

Figure 2:
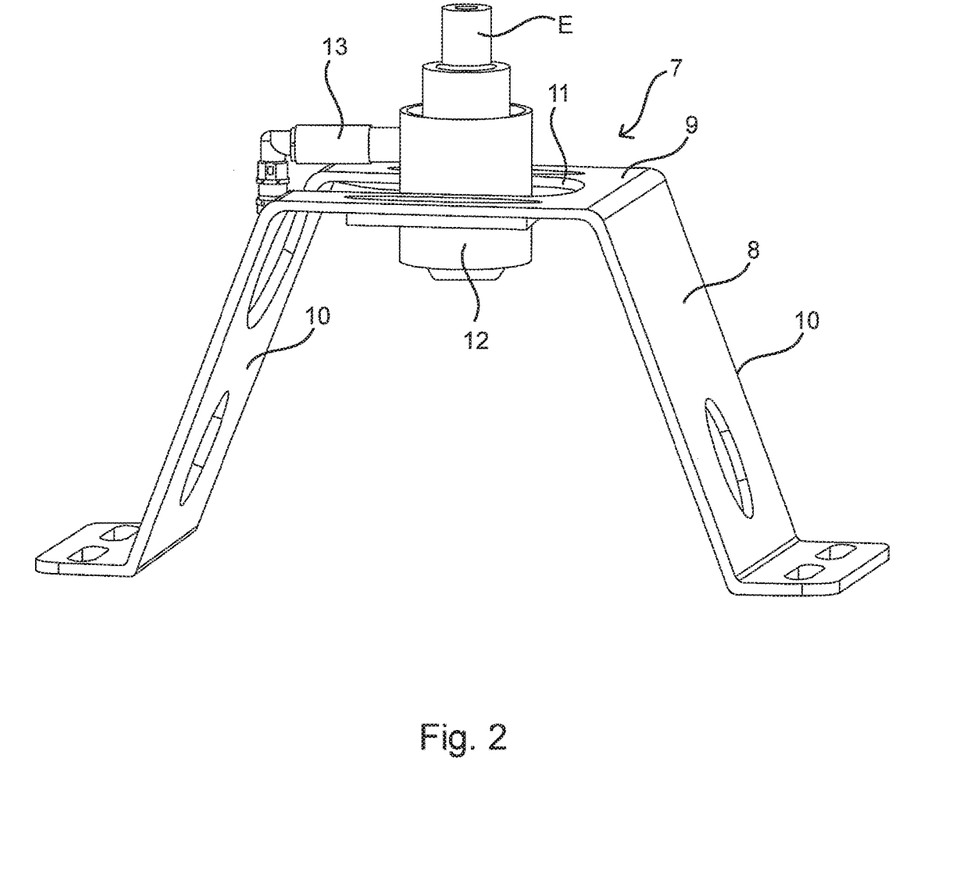
FIG. 2 shows a perspective view of a safety bearing.
Figure 3:
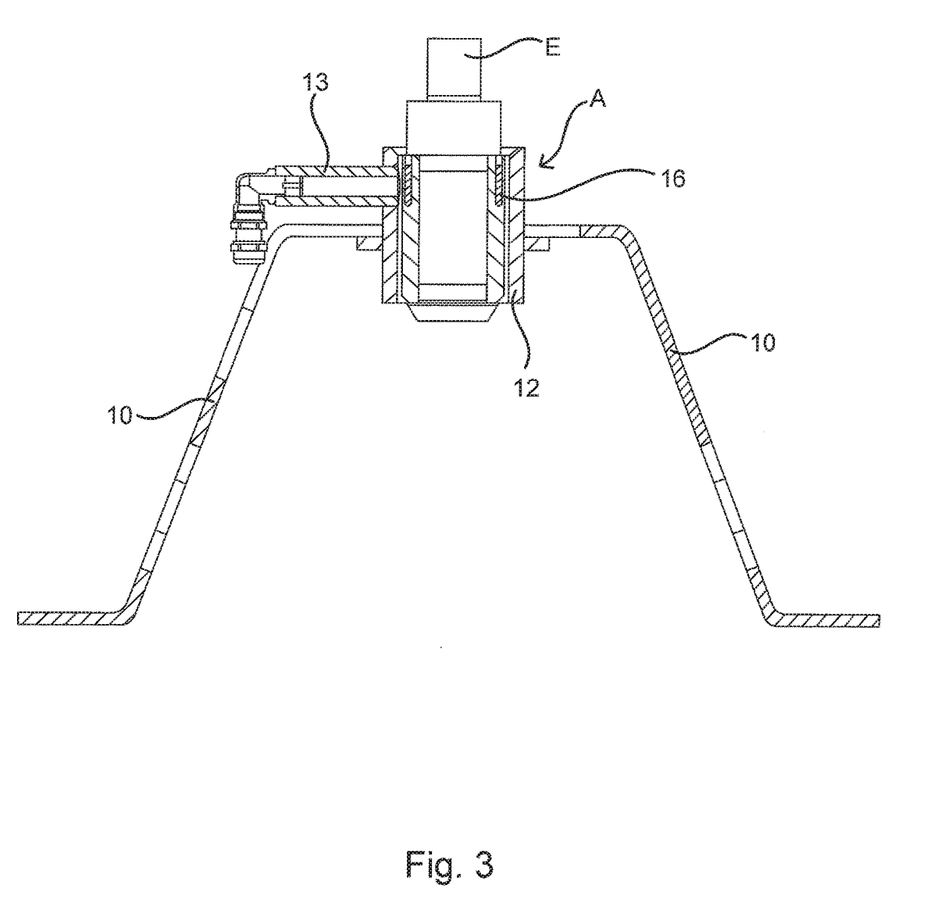
FIG. 3 shows a sectional view according to FIG. 2.
Figure 4:
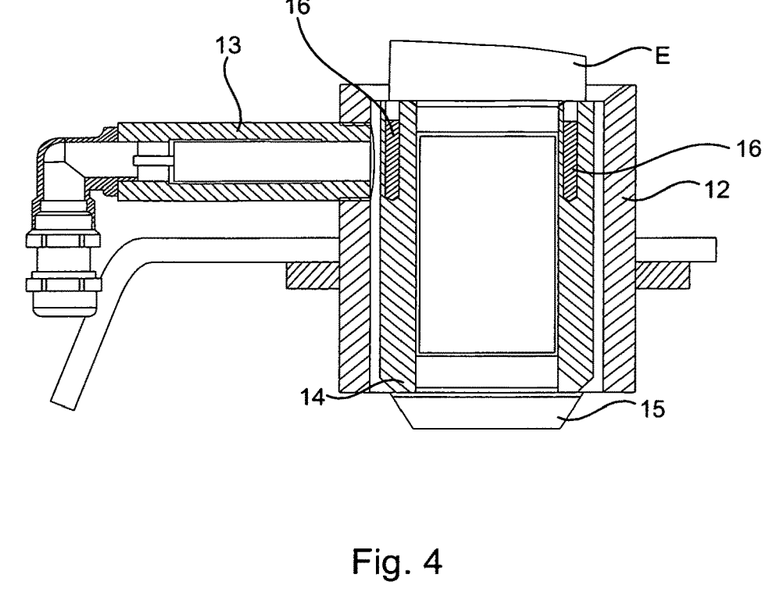
FIG. 4 shows a detailed view of the region A in FIG. 3.

FIGS. 2 to 4 show an exemplary embodiment of a safety bearing 7. It comprises a holding device 8, which is formed from a trapezoidal sheet metal. A raised portion 9 of the holding device 8 is supported against the tank base 2 (not shown here) via two limbs 10 extending from said portion. A recess 11 is provided in the raised portion 9, in which recess there is secured a bearing bush 12. The free end E of the drive shaft 4 (not shown here in greater detail) is rotatably held in the bearing bush 12. Reference sign 13 designates a sensor mounted on the bearing bush 12. A slide hush or slide sleeve 14 is provided at the free end E of the drive shaft 4 and can be produced from a plastic or metal. The material forming the slide sleeve 14 advantageously has a lower hardness than a further material forming the bearing bush 12. The bearing bush 12 is usually produced from metal, in particular steel. The slide sleeve 14 is secured by means of a screw 15 or the like mounted on the free end E of the drive shaft 4. A worn slide sleeve 14 can be removed by detaching the screw 15 from the free end E of the drive shaft 4 and can be replaced for a new slide sleeve 14. The slide sleeve 14 is preferably produced from an electrically non-conductive or a non-magnetic material, preferably from a plastic, such as PBT, PTFE, PA 6 G, PA 6, PA 66, PA 12 G, PET, PEEK, POM or the like.

In the slide sleeve 14 shown in FIGS. 3 and 4, detection elements are accommodated, which can be detected by the sensor 13 when they are guided past said sensor in the vicinity thereof. By way of example, the detection elements can be permanent magnets 16. In this case, the slide sleeve 14 is produced for example from a plastic. The permanent magnets 16 can be cast into the plastic.

Figure 5:
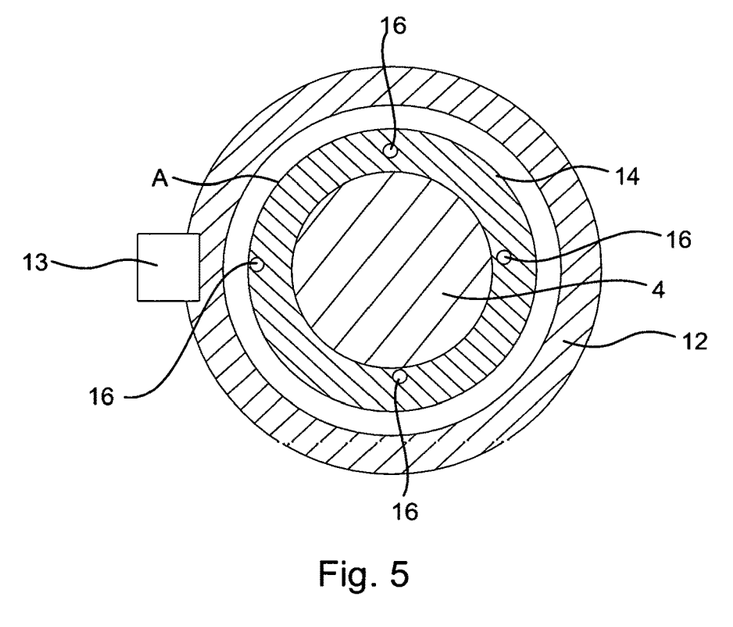
FIG. 5 shows a schematic sectional view of a first detection device.

FIG. 5 shows a schematic sectional view through a first detection device. Four permanent magnets 16 are accommodated in the slide sleeve 14, distributed uniformly over the periphery thereof. The permanent magnets 16 are arranged at different depths in the slide sleeve 14 with respect to an outer periphery A. In the present exemplary embodiment a magnetic field sensor, in particular a Hall sensor, is used as sensor 13.

Figure 6:
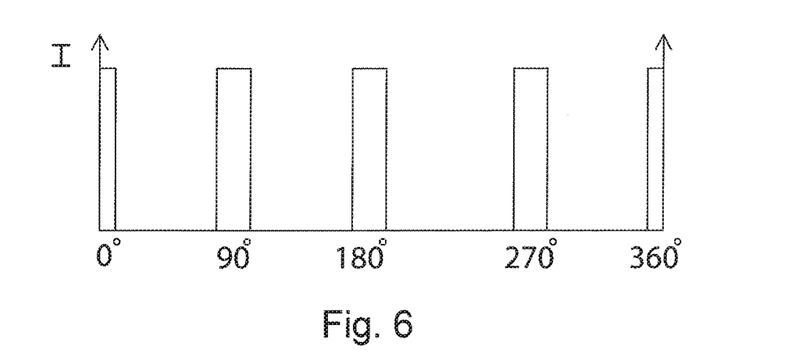
FIG. 6 shows a first pulse sequence over the angle of rotation.

FIG. 6 shows a first pulse sequence, detected by means of the sensor 13, when all permanent magnets 16 are contained in the slide sleeve 14. Four pulses are provided per revolution of the drive shaft 4.

Figure 7:
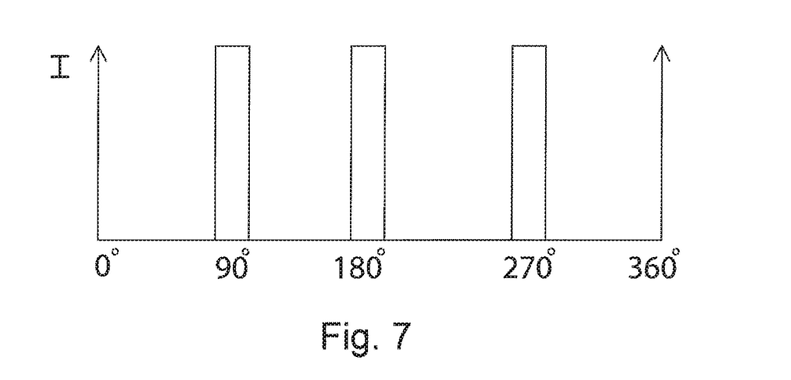
FIG. 7 shows a second pulse sequence over the angle of rotation.

FIG. 7 shows a second pulse sequence. Here, as a result of wear of the slide sleeve 14, the permanent magnet 16 mounted closest to the outer periphery A has already broken off. In this case there are only three pulses per revolution of the drive shaft 7.

Figure 8:
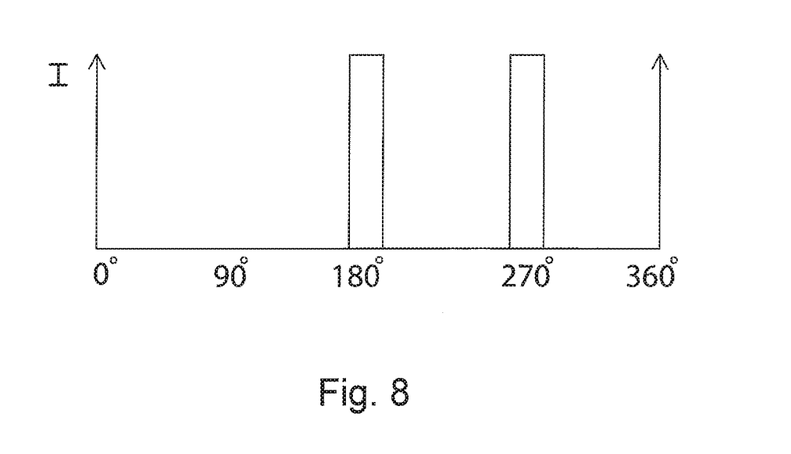
FIG. 8 shows a third pulse sequence over the angle of rotation.

In the third pulse sequence shown in FIG. 8, two permanent magnets 16 have already broken off from the slide sleeve 14 as a result of increasing wear. In this case, only two pulses are generated by the sensor 13 per revolution.

Depending on the pulse number per unit of time or a pulse frequency, it is possible to display a state of wear of the slide sleeve 14 outside the wastewater tank by means of a display device. Furthermore, the drive device 1 can be automatically shut down depending on the pulse frequency in order to avoid damage at the free end E of the drive shaft 4 and/or at the bearing bush 12.

Figure 9:
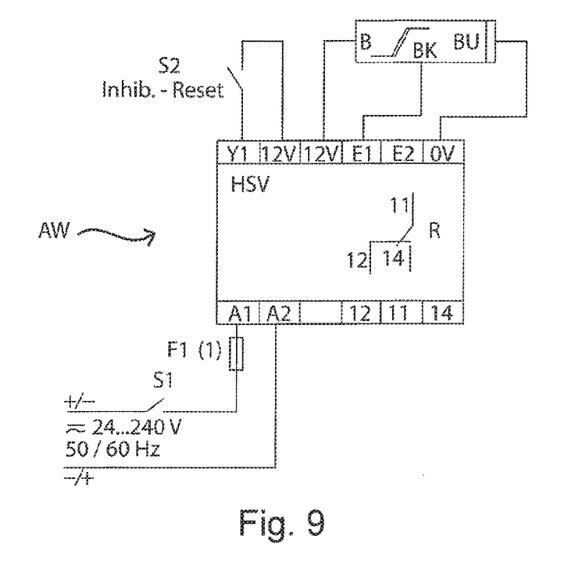
FIG. 9 shows an evaluation device.
Figure 10:
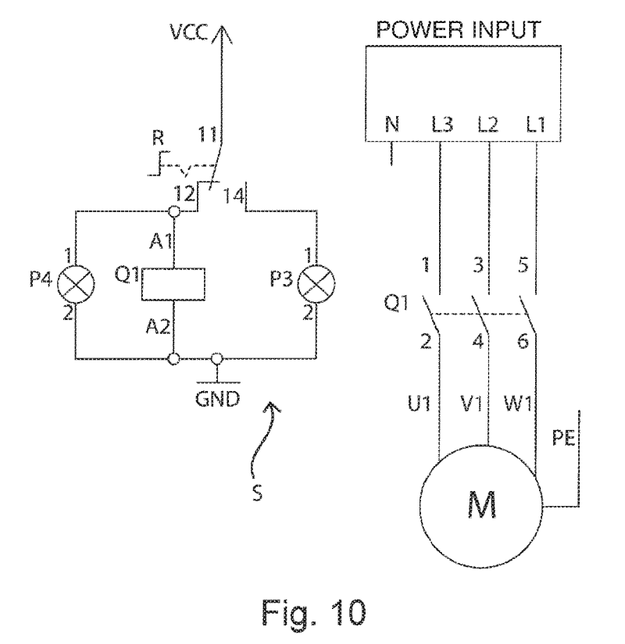
FIG. 10 shows a circuit for automatic shutdown.

FIGS. 9 and 10 show exemplary embodiments of an evaluation device AW and of a circuit S for automatically shutting down the drive device. In the case of the evaluation device AW shown in FIG. 9, a Hall sensor for example is supplied with a measurement voltage via the terminals 0V and 12V. A sensor signal is detected via the terminal E1. The evaluation device AW is supplied with a mains voltage via the connections A1 and A2, which voltage can be interrupted by a first switch S1. It is possible with a second switch S2 to reset a relay R. A switch position of the relay R is selected by means of the evaluation device AW depending on the pulse frequency.

FIG. 10 shows a circuit S for automatically shutting down a motor M of the drive device 1 (not shown here). Reference sign Q1 designates a contactor, which is opened while switching the relay R from the switch position 11/12 into the switch position 11/14. Reference signs P3 and P4 designate display lamps, which display the switched state of the contactor Q1. By way of example, an acoustic signal means can be provided instead of or additionally to the display lamp P3, with which signal means the automatic shutdown of the drive device can be displayed.

Figure 11:
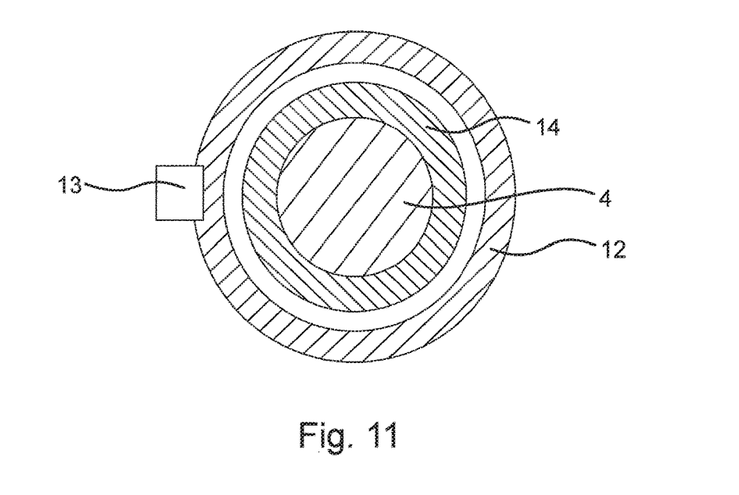
FIG. 11 shows a schematic sectional view of a second detection device.

FIG. 11 shows a schematic cross-sectional view through a second detection device. Here, the sensor 13 is a strain or bending sensor. By way of example, it can be a strain gauge, a piezoelectric bending sensor, or the like. With a sensor 13 of this type, deformations or vibrations of the bearing bush 12 can be detected depending on the angle of rotation of the drive shaft 4. With increasing wear of the slide sleeve 14, the deformations or vibrations in the bearing bush 12 increase with the rotation of the drive shaft 4.

Figure 12:
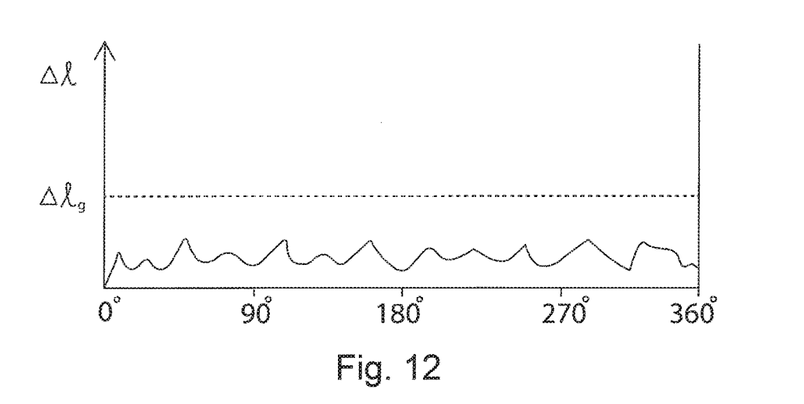
FIG. 12 shows a first strain profile of the bearing bush over the angle of rotation.

FIG. 12 shows a deformation $\Delta l$ over the angle of rotation when the slide sleeve 14 is not worn or is hardly worn.

Figure 13:
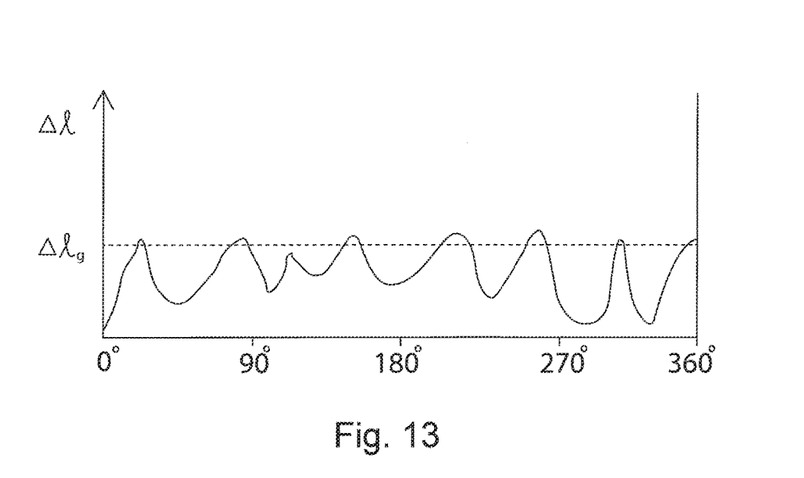
FIG. 13 shows a second strain profile of the bearing bush over the angle of rotation.

FIG. 13 shows the deformation of $\Delta l$ the bearing bush 12 over the angle of rotation, when the slide sleeve 14 is worn. In this case the amplitudes of the deformation $\Delta l$ are greater than a predefined limit value $\Delta l_g$. When the amplitudes of the deformation $\Delta l$ exceed the limit value $\Delta l_g$, this can be used to generate a stop signal for shutting down the drive device 1.

Figure 14:
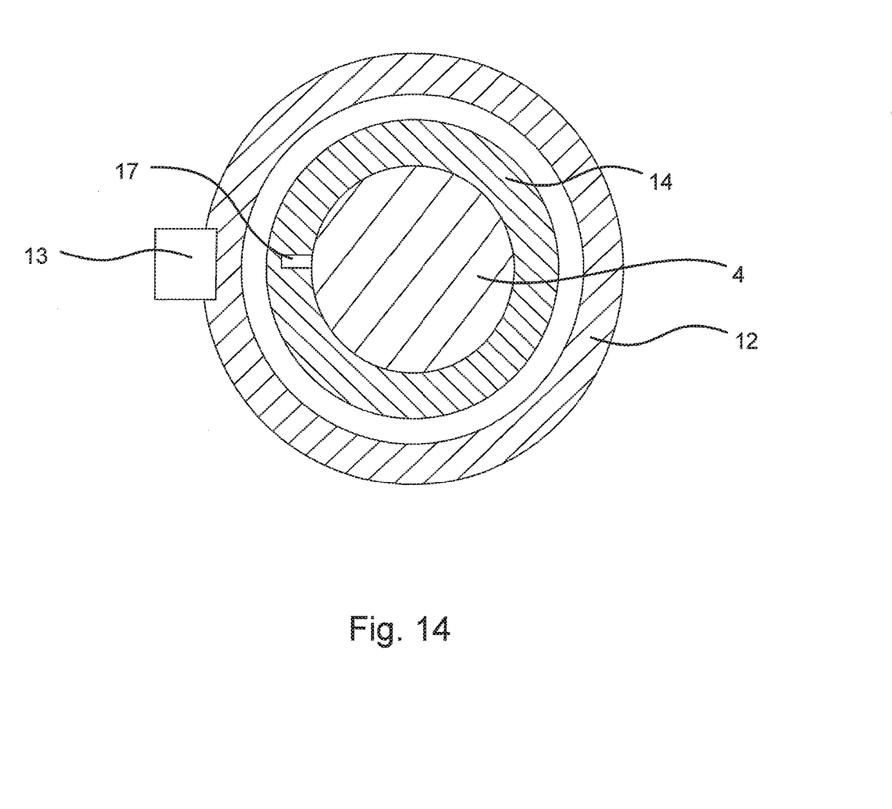
FIG. 14 shows a schematic sectional view of a third detection device.

FIG. 14 shows a schematic sectional view through a third detection device. The slide sleeve 14 is in this case provided with a contact pin 17, which is electrically conductively connected to the drive shaft 4 produced from metal. The slide sleeve 14 is in this case produced from a plastic, for example. Here, a simple electrical contact, which is connected to the bearing bush 12, likewise produced from metal, is used as sensor 13. By means of a simple resistance measurement, a state can be identified in which the contact pin 17 is in contact with the bearing bush 12. A signal of this type can be used likewise to shut down the drive device 1.

LIST OF REFERENCE SIGNS 1 drive device
2 tank base
3 bridge
4 drive shaft
5 stirring body
6 ring line
7 safety bearing
8 holding device
9 raised portion
10 limb
11 recess
12 bearing bush
13 sensor
14 slide sleeve
15 screw
16 permanent magnet
17 contact pin
A outer periphery
AW evaluation device
A1 A2 connection
E free end
M motor
P3, P4 display lamp
Q1 contactor
R relay
S circuit
S1 first switch
S2 second switch

The invention claimed is:

1. A stirring device for wastewater, comprising
a drive device having a drive shaft extending vertically therefrom in an assembled state,
a stirring body mounted on the drive shaft,
a safety bearing, in which a free end of the drive shaft is rotatably held,
a slide sleeve mounted on the free end of the drive shaft, and
a device for detecting a state of wear of the slide sleeve,
wherein the device for detecting the state of wear comprises a sensor mounted on the safety bearing and an evaluation device for evaluating signals delivered by the sensor,
a plurality of permanent magnets detectable by means of the sensor is accommodated in, and distributed over a periphery of, the slide sleeve, and
the plurality of permanent magnets is provided in the slide sleeve at different depths from one another with respect to an outer periphery of the slide sleeve.

2. The stirring device according to claim 1, wherein the evaluation device comprises a circuit, which automatically switches off the drive device upon detection of a predefined state of wear of the slide sleeve.

3. The stirring device according to claim 1, wherein the device for detecting the state of wear comprises a display device for displaying an operating state determined by the evaluation device.

4. The stirring device according to claim 3, wherein the operating state is the state of wear of the slide sleeve or an emergency stop state.

5. The stirring device according to claim 1, wherein the safety bearing comprises a bearing bush surrounding the slide sleeve and the sensor is mounted on the bearing bush.

6. The stirring device according to claim 5, wherein the safety bearing comprises a holding device for securing to a base of a wastewater tank and the bearing bush is secured to the holding device detachably.

7. The stirring device according to claim 1, wherein the sensor is a magnetic field sensor, and the magnetic field sensor is a Reed switch or a Hall sensor.

8. The stirring device according to claim 1, wherein the plurality of permanent magnets is distributed uniformly over the periphery of the slide sleeve.

9. The stirring device according to claim 1, wherein the stirring body is formed in a hyperboloid-like manner.

* * * * *